(12) United States Patent
Zhang

(10) Patent No.: US 11,340,487 B2
(45) Date of Patent: May 24, 2022

(54) DISPLAY DEVICE

(71) Applicant: WUHAN CHINA STAR OPTOELECTRONICS TECHNOLOGY CO., LTD., Hubei (CN)

(72) Inventor: Guiyang Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 55 days.

(21) Appl. No.: 16/965,354

(22) PCT Filed: Jun. 2, 2020

(86) PCT No.: PCT/CN2020/093834
§ 371 (c)(1),
(2) Date: Jul. 28, 2020

(87) PCT Pub. No.: WO2021/208208
PCT Pub. Date: Oct. 21, 2021

(65) Prior Publication Data
US 2021/0325703 A1    Oct. 21, 2021

(51) Int. Cl.
| | | |
|---|---|---|
| G09G 5/10 | (2006.01) | |
| G02F 1/1334 | (2006.01) | |
| G02F 1/135 | (2006.01) | |
| G09G 3/34 | (2006.01) | |
| G02F 1/1335 | (2006.01) | |
| G09G 3/36 | (2006.01) | |

(52) U.S. Cl.
CPC ............ *G02F 1/1334* (2013.01); *G02F 1/135* (2013.01); *G02F 1/133622* (2021.01); *G09G 3/3413* (2013.01); *G09G 3/3648* (2013.01)

(58) Field of Classification Search
CPC ............. G02F 1/1334; G02F 1/133308; G02F 1/133528; G02F 1/1368; G02F 1/135; G09G 3/3413
USPC ........................................................ 345/173
See application file for complete search history.

(56) References Cited

U.S. PATENT DOCUMENTS

| | | | | |
|---|---|---|---|---|
| 5,450,220 | A | * 9/1995 | Onishi | ................ C09K 19/544 349/89 |
| 2005/0156839 | A1 | 7/2005 | Webb | |
| 2006/0209232 | A1 | 9/2006 | Komitov et al. | |
| 2019/0331955 | A1* | 10/2019 | Lee | ................... G02F 1/134309 |
| 2020/0064681 | A1* | 2/2020 | Son | ....................... G06F 1/1643 |

(Continued)

FOREIGN PATENT DOCUMENTS

| | | |
|---|---|---|
| CN | 109828402 A | 5/2019 |
| CN | 110231735 A | 9/2019 |

(Continued)

*Primary Examiner* — Jennifer T Nguyen
(74) *Attorney, Agent, or Firm* — Mark M. Friedman

(57) ABSTRACT

A display panel is provided comprising a display surface and a non-display surface disposed opposite to the display surface, the display panel comprises a first display area, a second display area, and a photosensitive component. A polymer dispersed liquid crystal film is disposed in the second display area, wherein the photosensitive component is disposed on a side of the non-display surface of the display panel is disposed corresponding to the second display area.

11 Claims, 2 Drawing Sheets

(56) References Cited

U.S. PATENT DOCUMENTS

2020/0192142 A1\* 6/2020 Kim .................. G02F 1/133528
2020/0249506 A1\* 8/2020 Yang ................. G02F 1/133514
2020/0341314 A1\* 10/2020 Jung ................. G02F 1/136286

FOREIGN PATENT DOCUMENTS

| CN | 110456562 A | 11/2019 |
|---|---|---|
| CN | 110488520 A | 11/2019 |
| CN | 110796055 A | 2/2020 |
| WO | 2004072713 A2 | 8/2004 |

\* cited by examiner

DISPLAY DEVICE

BACKGROUND OF INVENTION

Field of Invention

The application relates to the display field, and particularly relates to a display device.

Description of Prior Art

Blind-hole screens were developed to achieve a full screen display effect. The so-called blind-hole screen refers to a technology wherein a hole is provided in a backlight layer of a display device, and a camera is disposed under a protective cover plate and a display panel.

In blind-hole display devices, areas where the cameras are disposed do not display, leading to missing parts in an image, destroying integrity of the image, and affecting overall sensory effect.

In view of this, a display device which can improve integrity of display images so as to improve overall sensory effects is provided.

SUMMARY OF INVENTION

A display panel is provided by the present application comprising a display surface and a non-display surface disposed opposite to the display surface, the display panel comprises a first display area and a second display area, and a polymer dispersed liquid crystal film is disposed in the second display area; and a photosensitive component, wherein the photosensitive component is disposed on a side of the non-display surface of the display panel and the photosensitive component is disposed corresponding to the second display area.

In one embodiment, the display device comprises a first backlight module disposed on the side of the non-display surface, the first backlight module is disposed corresponding to the first display area, a through-hole is provided in the first backlight module and the photosensitive component is located in the through-hole.

In one embodiment, a spacer is disposed between the first display area and the second display area.

In one embodiment, the display device further comprises a second backlight module and the second backlight module is located on a side of the spacer towards the second display area.

In one embodiment, the display device comprises a first base substrate and a second base substrate disposed opposite to the first substrate, a first electrode layer, and a second electrode layer are disposed in the second display area, the first electrode layer is disposed on a side of the first base substrate towards the second base substrate, the second electrode layer is disposed on a side of the second base substrate towards the first base substrate, and the polymer dispersed liquid crystal film is located between the first electrode layer and the second electrode layer.

In one embodiment, the first electrode layer is located in a same layer as one of a source/drain electrode, a common electrode and a pixel electrode.

In one embodiment, a light-emitting angle from the second backlight module to the first base substrate is greater than or equal to a total reflection angle of the first base substrate.

In one embodiment, a light transmittance of the polymer dispersed liquid crystal film is greater than 70%.

In one embodiment, the polymer dispersed liquid crystal film comprises a polymer base material, liquid crystal molecules dispersed in the polymer base material, the liquid crystal molecules have an ordinary refractive index $n_o$ and an extraordinary refractive index ne, an refractive index of the polymer base material is $n_p$, and a refractive index of each of the first base substrate and the second base substrate is $n_g$, wherein $n_o-0.05 \leq n_p \leq n_o+0.05$, $n_o-0.05 \leq n_g \leq n_o+0.05$, and $n_e$ is greater than $n_o$, $n_p$, and $n_g$.

In one embodiment, $n_e$ is 1.7, $n_o$, $n_p$, and $n_g$ are 1.5.

In one embodiment, the second display area is configured to be in a transparent state when a voltage is applied and is configured to display images when no voltage is applied. In one embodiment, the polymer dispersed liquid crystal film comprises polymer molecules exhibiting birefringence.

In one embodiment, the display device comprises a field sequential color controller, wherein the field sequential color controller is configured to provide a color image data corresponding to one of two colors of backlight to the display panel in a first sub-color field period and is configured to provide a color image data corresponding to another one of the two colors of backlight to the display panel in a second sub-color field period.

Comparing to prior art, in the present application, the second display area of a polymer dispersed liquid crystal display unit is configured in a position corresponding to the photosensitive component, wherein the polymer dispersed liquid crystal display unit can switch between a transparent display state and a transmitting state, and can display a completed image cooperating with the first display area. Furthermore, the second display area can maintain a relatively large light transmittance while displaying, which can not only display images, but also ensure normal functioning of the photosensitive component. Besides, the second display area can also provide light compensation in a dark environment.

In addition, the second display area is driven by a field sequential color display method, so as to improve light transmittance of displaying.

BRIEF DESCRIPTION OF DRAWINGS

In order to more clearly illustrate the technical solution of the present application, a brief description of the drawings that are necessary for the illustration of the embodiments will be given as follows. Obviously, the drawings described below show only some embodiments of the present invention, and a person having ordinary skill in the art may also obtain other drawings based on the drawings described without making any creative effort.

DETAILED DESCRIPTION OF PREFERRED EMBODIMENTS

The present disclosure is further described in detail below with reference to the accompanying drawings and embodiments. Obviously, the following described embodiments are only part of the present disclosure but not all. A person having ordinary skill in the art may obtain other embodiments based on the embodiments provided in the present disclosure without making any creative effort, which all belong to the scope of the present disclosure.

Figure 1:
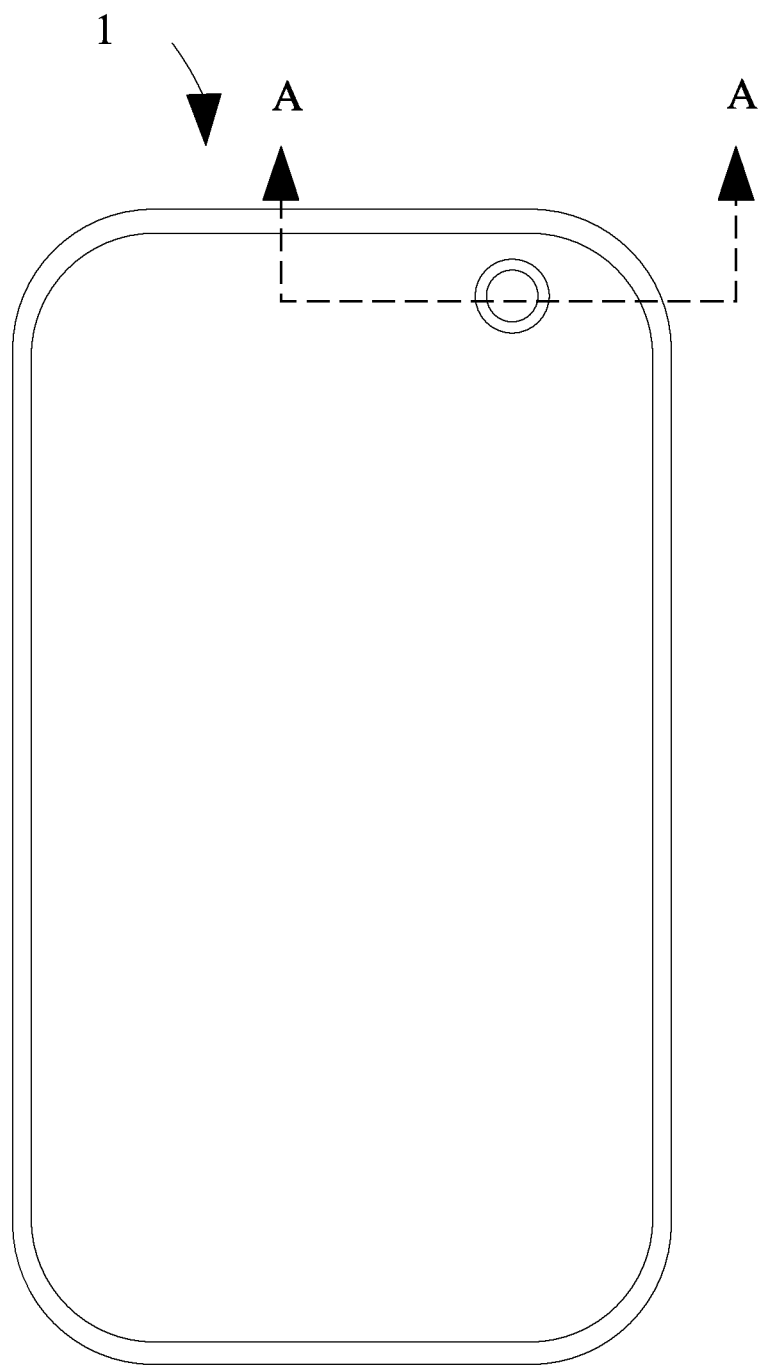
FIG. 1 is a top view of a display device according to a first embodiment of the present application.
Figure 2:
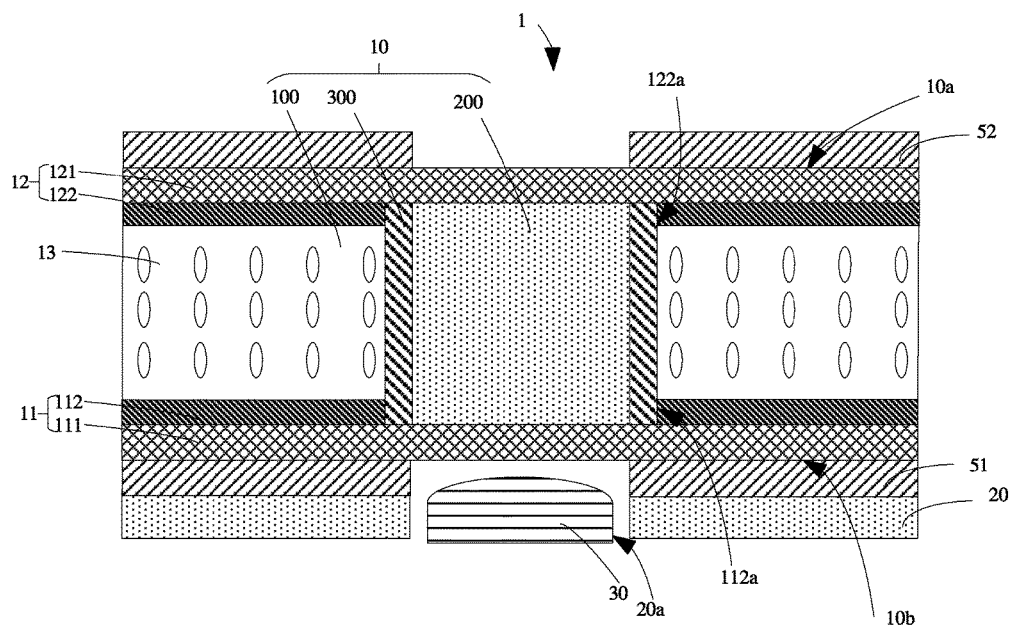
FIG. 2 is a partial enlarged drawing of the display device of FIG. 1.

Please refer to FIG. 1 and FIG. 2, a display device 1 of a first embodiment of the present application is a passive light-emitting display device. For example, it is a liquid crystal display device. The display device 1 includes a display panel 10, a first backlight module 20, a photosensitive component 30 and a second backlight module 40. The display panel 10 can be divided into a first display area 100 and a second display area 200 corresponding to the photosensitive component 30. The first display area 100 can be disposed around the second display area 200. A spacer 300 configured to separate the first display area 100 from the second display area 200 can be disposed between the first display area 100 and the second display area 200.

The display panel 10 includes a display surface 10a and a non-display surface 10b disposed opposite to the display surface 10a. The first backlight module 20 is disposed on a side of the non-display surface 10b of the display panel 10, and is disposed corresponding to the first display area 100. The first backlight module 20 is configured to provide backlight to the first display area 100. While displaying, light emitted by the first backlight module 20 enters the first display area 100 via the non-display surface 10b, and is emitted out of the display surface 10a. A through-hole 20a is provided in the first backlight module 20. The photosensitive component 30 is disposed in the through-hole 20. The photosensitive component 30 includes, but is not limited to an under-screen camera, an under-screen optical fingerprint recognition sensor, an under-screen optical face recognition sensor, and an under-screen optical distance sensor, etc. That is to say, the display device 1 can be formed as a blind-hole screen.

The display device 1 further comprises a first polarizer 51 disposed between the display panel 10 and the first backlight module 20, and a second polarizer 52 disposed on a side of the display panel 10 away from the first backlight module 20. An opening corresponding to the through-hole 20a is provided in the first polarizer 51 and the second polarizer 52. The openings are configured to allow external light to enter the photosensitive component 30. The display device 1 further includes a cover glass disposed on a side of the second polarizer 52 away from the display panel 10. The cover glass is attached to the second polarizer 52 using an optical adhesive. It can be understood that the display device 1 further includes other commonly used components of display devices, such as a driver circuit, a flexible circuit board, and a frame etc.

The second backlight module 40 is located on a side of the spacer 300 towards the second display area 200 and is configured to provide backlight to the second display area 200.

In one embodiment of the present application, the first display area 100 is a liquid crystal display area. The display panel 10 includes a first substrate 11, a second substrate 12 and liquid crystal molecules 13 disposed between the first substrate 11 and the second substrate 12. The first substrate 11 includes a first base substrate 111 and a first functional membrane 112 disposed on the first base substrate 111. A refractive index of the first base substrate 111 is $n_g$. A first opening 112a is provided in the first functional membrane 112. In one embodiment of this application, the first substrate 11 can be an array substrate. The first functional membrane 112 includes a thin film transistor layer, a common electrode layer, and a pixel electrode layer. The first functional membrane 112 can further comprise an insulating layer, a passivation layer, a planarizing layer and an alignment layer and so on. The first opening 112a is a through-hole penetrating the first functional membrane 112, and the first base substrate 111 is exposed by the first opening 112a. In other embodiment of this application, the first opening 112a can also be a blind-hole provided in the first functional membrane 112. For example, the thin film transistor layer includes a light-shielding layer, a buffer layer, a semiconductor layer, a gate insulating layer, a gate electrode layer, an interlayer insulation layer, and a source/drain electrode layer, etc., which are sequentially stacked. The first opening 112a penetrates to the semiconductor layer, so that the buffer layer is exposed by the first opening 112a.

The second substrate 12 includes a second base substrate 121 and a second functional membrane 122 disposed on the second base substrate 121. The first base substrate 111 and the second base substrate 121 are transparent substrates. A refractive index of the first second substrate 121 is $n_g$. A second opening 122a is provided in the second functional membrane 122. The first opening 112a and the second opening 122a are configured corresponding to the through-hole 20a, and are used for configuring the second display area 200 and to allow light to enter the photosensitive component 30. For example, the first opening 112a is coaxially arranged with the second opening 122a and the through-hole 20a. In one embodiment of the present disclosure, the second substrate 12 can be a color filter substrate, the second functional membrane 122 includes a color filter layer and a black matrix. The second functional membrane 122 can further include an alignment film, etc. In one embodiment of the present application, the second opening 122a is a through-hole penetrating the second functional membrane 112. The second base substrate 122 is exposed from the second opening 122a. In other embodiments of the present application, the second opening 122a can also be a blind-hole provided in the second functional membrane 122. In other embodiments of the present application, the color filter layer can be disposed on the array substrate, that is a COA (color filter on array) display panel. At the same time, the black matrix can be formed on the array substrate along with the color filter layer and can also be formed on another substrate. The first display area 100 can be a vertical electric field type display area, such as a TN type display area.

The second display area 200 is disposed corresponding to the through-hole 20a and the openings provided in the first polarizer 51 and the second polarizer 52. The second display area 200 is configured to allow light to enter the photosensitive component 30. There is no restriction on shape and position of the second display area 200 in the present application. In one embodiment, the second display area 200 is circular in a top view. The second display area 200 is located above the photosensitive component 30, and the second display area 200 can display missing images which should have been displayed, located above the photosensitive component 30, to display the completed image cooperating with the first display area 100. Furthermore, the second display area 200 can maintain a relatively large light transmittance while displaying, which can not only display images, but also ensure normal functioning of the photosensitive component 30. Besides, the second display area 200 can also provide light compensation in a dark environment.

Figure 3:
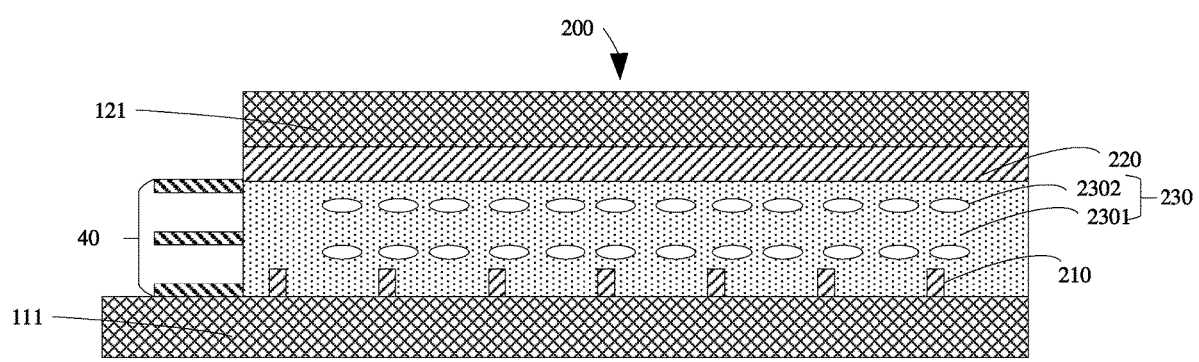
FIG. 3 is cross-sectional view of a second display area of FIG. 1.

The second display area 200 is defined as a position between the first opening 112a and the second opening 122a. Please refer to FIG. 3, the second display area 200 is a polymer dispersed liquid crystal (PDLC) display area. A first electrode layer 210, and a second electrode layer 220 and polymer dispersed liquid crystals 230 are configured in the second display area 200.

The first electrode layer 210 is disposed on a side of the first base substrate 111 towards the second base substrate 121. There is no restriction on shape of the first electrode layer 210, for example, it can be a planar electrode, or a plurality of electrodes having a bar shape. A material of the first electrode layer 210 can be a metal oxide or a metal. The metal oxide, for example can be indium tin oxide (ITO). The metal, for example could be a metal with high light transmittance, such as copper or molybdenum etc. The first electrode layer 210 can be located in a same layer as one of a source/drain electrode, a common electrode and a pixel electrode. In one embodiment, the first electrode layer 210 can be manufactured in a same process as one of the source/drain electrode, the common electrode and the pixel electrode.

The second electrode layer 220 is disposed on a side of the second base substrate 121 towards the first base substrate 111. There is no restriction on shape of the second electrode layer 220, for example, it can be a planar electrode, or a plurality of electrodes having a bar shape. A material of the second electrode layer 220 can be selected from the materials of the first electrode layer 210.

The polymer dispersed liquid crystal film 230 is located between the first electrode layer 210 and the second electrode layer 220. The polymer dispersed liquid crystal film 230 is a liquid of high transparency formed by mixing liquid crystal molecules 2301 and a polymer base material 2302 in a certain ratio. A light transmittance of the polymer dispersed liquid crystal film 230 is greater than 70%. The polymer dispersed liquid crystal film 230 can be a plurality of liquid crystal molecules 2301 dispersed in the polymer base material 2302, or the liquid crystal molecules 2301 contained in the polymer base material 2302 having a network shape. The liquid crystal molecules 2301 exhibit birefringence, and have an ordinary refractive index no and an extraordinary refractive index $n_e$. A refractive index of the polymer base material 2302 is $n_p$. Wherein $n_o-0.05 \leq n_p \leq n_o+0.05$, $n_o-0.05 \leq n_g \leq n_o+0.05$, and $n_e$ is greater than $n_o$, $n_p$ and $n_g$. When not displaying, the refractive indexes of the liquid crystal molecules 2301, the polymer base material 2302 and the first base substrate 111 are relatively uniform and scattering hardly happens, $n_e$ is greater than $n_o$, $n_p$, and $n_g$. In one embodiment, $n_e$ is 1.7, $n_o$, $n_p$, and $n_g$ are 1.5. In other embodiments of the present application, the polymer molecules consisting the polymer base material 2301 also exhibit birefringence. In this case, display effect and transparency of the display panel 10 can be further improved.

In one embodiment, the second backlight module 40 is located on a side of the polymer dispersed liquid crystal film 230, that is to say, the second backlight module 40 is disposed along a side of the polymer dispersed liquid crystal film 230 located between the first electrode layer 210 and the second electrode layer 220. The second backlight module 40 includes a three-color second backlight module of red, green and blue, for example, red, green, and blue three-color LEDs. A light-emitting angle from the second backlight module 40 to the first base substrate 111 is greater than or equal to a total reflection angle $\arcsin(1/n_g)$ of the first base substrate 111.

The second display area 200 is turned down when no voltage is applied. When light from the second backlight module 40 is emitted to the first base substrate 111 with an angle greater than or equal to a total reflection angle $\arcsin(1/n_g)$ of the first base substrate 111, a total reflection of light happens at an interface of the first base substrate 111 and the air. As the refractive indexes of the whole layer of the polymer dispersed liquid crystal film 230 and the first base substrate 111 and the second base substrate 121 are about the same, total reflections of the light emitted from the second backlight module 40 happen repeatedly inside the second display area 200, and cannot pass through the first base substrate 111 and the second base substrate 121. At this time, the second display area 200 does not display images but turns transparent, external light enters the photosensitive component 30 through the second display area 200.

A voltage is applied between the first electrode layer 210 and the second electrode layer 220 to control deflecting of the liquid crystal molecules 2301 in the polymer dispersed liquid crystal film 230. When a voltage is applied to the second display area 200, the liquid crystal molecules 2301 are deflected by the electric field, but the polymer base material 2302 is not affected by the electric field, so that refractive index $n_e$ of the light emitted by the second backlight module 40 at the liquid crystal molecules 2301 and refractive index $n_p$ of the light emitted by the second backlight module 40 at the polymer base material 2302 are different. The light emitted from the second backlight module 40 is scattered by the liquid crystal molecules 2301. The total reflection of the light between the first base substrate 111 and the air is broken, and the light is emitted out of the second display area 200 and images are displayed. At same time, external light still enters the photosensitive component 30 through the polymer base material 2302 of the polymer dispersed liquid crystal film 230. At the same time of picture displaying, light is provided to the photosensitive component 30.

It can be understood that the second display area 200 can also be configured to be in a transparent state when a voltage is applied and is configured to display images when no voltage is applied.

The second display area 200 is driven by a field sequential color display method, that utilizes a phenomenon of visual persistence in human eyes, a time-divided display is performed using a three-color second backlight module to display color images. That is to say, the display device 1 further includes a field sequential color controller. The field sequential color controller divides a frame period T into a first sub-color field period and a second sub-color field period. The field sequential color controller provides a first color image data to the display panel 10 in the first sub-color field period and provides a second color image data to the display panel 10 in the second sub-color field period. A second backlight module driver of the second display area 200 controls an RGB light-emission of the three-color second backlight module according to the color image data received. A field sequential color controlling method is used in the display device 1 to mix colors of color filters in a spatial axis, that is to say, a color mixture of three sub pixels, red (R), green (G) and blue (B) in the spatial axis within a range smaller than a human eye's field of view is replaced by a color mixture in a time axis by the light-emitting diodes of the second backlight module, that is, within a time range of visual persistence in human eyes, the three-color images of red (R), green (G) and blue (B) are quickly switched in the time axis to obtain an color mixture effect. Thus, there is no need to configure polarizers and a color film layer in the second display area 200, so as to improve light transmittance of displaying. It can be understood that there are no restrictions on a number of the sub-color field periods, in other embodiments of the present application, the one frame period T can be also divided into more than three sub-color field periods.

In the present application, the second display area of polymer dispersed liquid crystal display unit is configured in a position corresponding to the photosensitive component, wherein the polymer dispersed liquid crystal display unit can switch between a transparent display state and a transmitting state, and can display a completed image cooperating with the first display area. Furthermore, the second display area can maintain a relatively large light transmittance while displaying, which can not only display images, but also ensure normal functioning of the photosensitive component. Besides, the second display area can also provide light compensation in a dark environment.

In addition, the second display area is driven by a field sequential color display method, so as to improve the light transmittance of displaying.

The above description provides a detailed introduction to the application. In this disclosure, specific examples are applied to explain principle and embodiments of the application. The description of the above embodiments is only used to help understand the application. At the same time, for those skilled in the art, according to the thought of the present disclosure, there will be changes in the specific embodiments and application scope. In conclusion, the content of the specification should not be understood as the limitation of the application.

What is claimed is:

1. A display device comprising:
   a display panel, wherein the display panel comprises a display surface and a non-display surface disposed opposite to the display surface, the display panel comprises a first display area and a second display area adjacent to the first display area, and a polymer dispersed liquid crystal film is disposed in the second display area, wherein the polymer dispersed liquid crystal film comprises a polymer base material and liquid crystal molecules dispersed in the polymer base material, the liquid crystal molecules have an ordinary refractive index $n_o$ and an extraordinary refractive index $n_e$, a refractive index of the polymer base material is $n_p$, and a refractive index of each of the first base substrate and the second base substrate is $n_g$, wherein $n_o-0.05 \leq n_p \leq n_o+0.05$, $n_o-0.05 \leq n_g \leq n_o+0.05$ and $n_e$ is greater than $n_o$, $n_p$, and $n_g$; and
   a photosensitive component, wherein the photosensitive component is disposed on a side of the non-display surface of the display panel and the photosensitive component is disposed corresponding to the second display area.

2. The display device of claim 1, wherein the display device comprises a first backlight module disposed on the side of the non-display surface, the first backlight module is disposed corresponding to the first display area, a through-hole is provided in the first backlight module, and the photosensitive component is located in the through-hole.

3. The display device of claim 1, wherein the first display area is disposed around the second display area, and a spacer is disposed between the first display area and the second display area.

4. The display device of claim 3, wherein the display device further comprises a second backlight module, and the second backlight module is located on a side of the spacer towards the second display area.

5. The display device of claim 4, wherein the display device comprises a first base substrate and a second base substrate disposed opposite to the first substrate, a first electrode layer and a second electrode layer are disposed in the second display area, the first electrode layer is disposed on a side of the first base substrate towards the second base substrate, the second electrode layer is disposed on a side of the second base substrate towards the first base substrate, and the polymer dispersed liquid crystal film is located between the first electrode layer and the second electrode layer.

6. The display device of claim 5, wherein the first electrode layer is located in a same layer as one of a source/drain electrode, a common electrode and a pixel electrode.

7. The display device of claim 5, wherein a light-emitting angle from the second backlight module to the first base substrate is large than or equal to a total reflection angle of the first base substrate.

8. The display device of claim 7, wherein a light transmittance of the polymer dispersed liquid crystal film is greater than 70%.

9. The display device of claim 1, wherein $n_e$ is 1.7, $n_o$, $n_p$, and $n_g$ are 1.5.

10. The display device of claim 1, wherein the second display area is configured to be in a transparent state when a voltage is applied and is configured to display images when no voltage is applied.

11. The display device of claim 1, wherein the polymer dispersed liquid crystal film comprises polymer molecules exhibiting birefringence.

* * * * *